United States Patent [19]

Trujillo

[11] 4,057,174

[45] Nov. 8, 1977

[54] MEASURING LIQUID DISPENSER WITH FLAT TOP

[76] Inventor: John J. Trujillo, 18837 Lamson Road, Castro Valley, Calif. 94546

[21] Appl. No.: 629,694

[22] Filed: Nov. 7, 1975

[51] Int. Cl.² .............................................. B67D 5/22
[52] U.S. Cl. .................................... 222/49; 222/309; 222/385
[58] Field of Search .................... 222/41, 43, 44, 49, 222/50, 309, 383, 385, 372, 382, 143

[56] References Cited

U.S. PATENT DOCUMENTS

| Re. 19,777 | 12/1935 | Kantor | 222/309 |
| 3,211,384 | 10/1965 | Seaquist | 222/143 |
| 3,228,571 | 1/1966 | O'Donnell et al. | 222/385 |
| 3,452,901 | 7/1969 | Roach | 222/49 |

Primary Examiner—Robert B. Reeves
Assistant Examiner—H. Grant Skaggs
Attorney, Agent, or Firm—Alvin E. Hendricson

[57] ABSTRACT

A dispenser adapted for mounting upon a liquid container has a manually or machine operable plunger in a depending barrel with check valves communicating the lower end of the barrel with the interior of the container and a dispenser extending at an angle upwardly therefrom with a vertically slidable gauge having an upper end engaging the plunger to adjustably fix the maximum stroke thereof and presenting a substantially flat upper profile in the lowered position of gauge and plunger.

6 Claims, 5 Drawing Figures

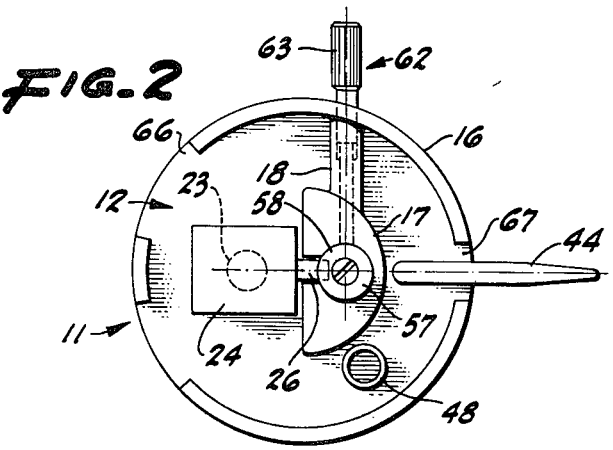
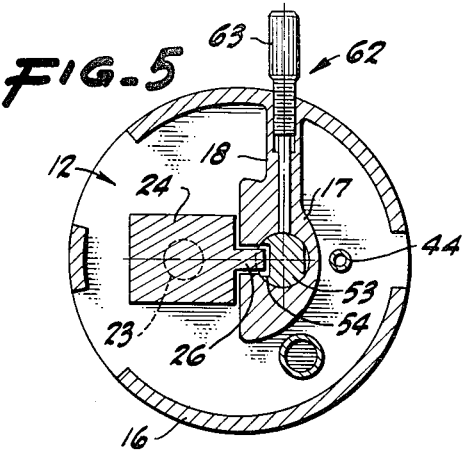
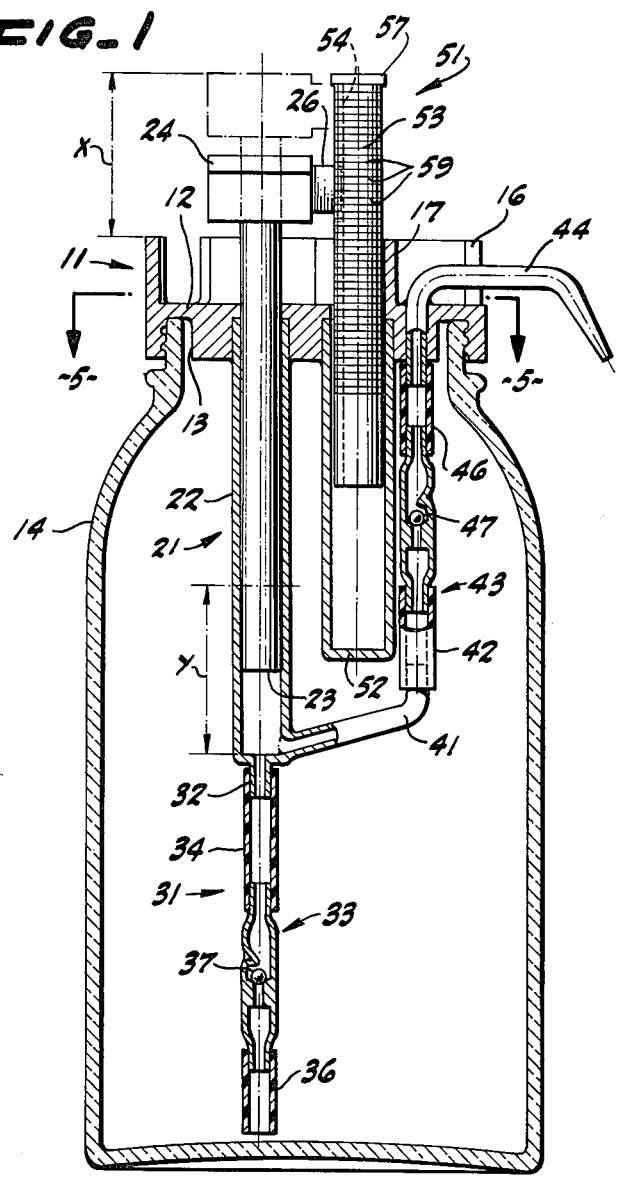
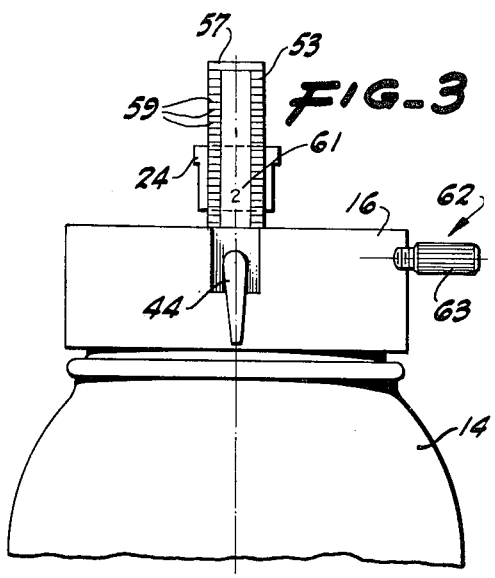
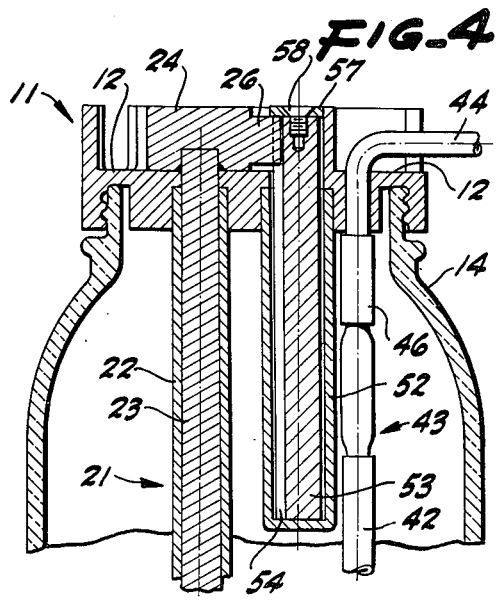

MEASURING LIQUID DISPENSER WITH FLAT TOP

BACKGROUND OF INVENTION

In many fields such as chemical research, for example, it is desirable to be able to dispense a metered amount of fluid in exact amounts. To this end there have been employed burettes, pipettes and the like and additionally there have been developed certain commercially available liquid dispensers having measuring means for rapidly dispensing rather precise amounts of liquid. Various devices of this type have been patented such as, for example, the pipette of U.S. Pat. No. 2,798,647, the measuring colorant dispenser of U.S. Pat. No. 3,118,568, and the liquid dispensing devices of U.S. Pat. Nos. 3,143,252, 3,211,335 and 3,452,901.

In addition to the provision of a dispenser for liquid which is capable of accurately metering the amount of liquid dispensed, it is desirable for the dispensing means or device to be relatively simple, rugged and maintenance-free, and to be easily purged of air and to maximize reproducibility of results. Various improvements along these lines are incorporated in the devices of the above-noted patents.

The present invention provides a further improvement in liquid dispensers over the improvements of the prior art including those of the above-noted patents. In particular, the present invention provides for a liquid dispenser adapted to fit upon a liquid container and provide a substantially flat top for the container when the dispenser is not in use. This is highly advantageous in providing maximum protection for the parts of the dispenser and also for providing the capability of stacking liquid containers having the liquid dispenser hereof attached thereto. As an example of the advantages of a flat upper profile afforded by the present invention is the intermittent dispensing of liquids requiring a particular environment for storage such as, for example, refrigeration. Normally, only limited storage space is available for liquid containers requiring a particular environment and thus it is highly advantageous to be able to stack these containers and the present invention provides this capability. A further advantage is found in shipping of such containers which occupy less room and are less susceptible to breakage. It is also noted that the low profile enhances the stability of the device.

SUMMARY OF INVENTION

The present invention comprises a liquid dispenser adapted for attachment to the open top of a liquid container and operable to accurately dispense adjustable, predetermined volumes of liquid from the container. The present invention is particularly constructed to provide a flat or substantially planar upper surface of the dispensing device attached to the top of a liquid container when the device is not in use to thereby afford the capability of stacking liquid containers having the present invention attached thereto while limiting the possibility of tipping of the container.

The present invention includes a cap structure adapted for attachment to the open top of a liquid container as, for example, by threaded attachment thereto and all other portions of the device normally depend from this cap structure. The device includes a manually operable pump having a barrel depending from the cap structure with a plunger therein and an enlarged head for gripping the plunger to move same up and down in the barrel. The bottom of the barrel is connected by check valves to the interior of a container into which the pump extends and to a dispenser, such as a spout, extending from the cap structure.

Control over the amount of liquid dispensed by operation of the pump of the present invention is herein provided by a gauge rod depending from the cap structure and slidably disposed therein with markings thereon for adjustable positioning and extension above the cap structure. Locking means are provided to fix the gauge rod in desired extension above the cap structure for dispensing a predetermined volume of liquid as indicated by the markings on the rod. The enlarged head of the pump plunger slidably engages the gauge rod so that upward movement of the plunger is limited by the location of the top of the gauge rod. Consequently, the maximum stroke of the plunger is adjusted by appropriate positioning of the gauge rod and the pump is manually or machine operated by a fixed maximum stroke of the plunger each time a predetermined volume of liquid is to be dispensed.

A preferred embodiment of the present invention includes a low upstanding wall about the upper surface of the cap structure with a central boss upon this upper surface through which the gauge rod extends. The enlarged head of the plunger is of the same or less height than the boss and upstanding wall. The gauge rod preferably has a longitudinal slot therein with a lateral projection on the plunger fitting into the slot and the upper slot end being disposed adjacent the upper end of the gauge rod. Additionally it is preferable to seal the gauge rod by the provision of a closed tube depending from the cap structure about the gauge rod. Openings in the upstanding wall in the cap structure provide for finger access to the enlarged plunger head and provide an opening for extension of the dispenser or spout end below the upper surface of this upstanding wall.

DESCRIPTION OF FIGURES

The present invention is illustrated as to a single preferred embodiment thereof in the accompanying drawings wherein:

FIG. 1 is a vertical, sectional view of a preferred embodiment of the present invention attached to a liquid container;

FIG. 2 is a top plan view of the dispenser of FIG. 1;

FIG. 3 is a front elevational view of the dispenser of FIG. 1;

FIG. 4 is a partial vertical sectional view of the embodiment of the invention of FIG. 1 attached to a container; and FIG. 5 is a transverse sectional view taken in the plane 5—5 of FIG. 4.

DESCRIPTION OF PREFERRED EMBODIMENT

A preferred embodiment of the present invention is illustrated in the accompanying drawings and referring thereto it will be seen that the liquid dispenser of the present invention comprises a cap structure 11 including a circular plate or floor 12 having an annular indentation 13 about the underside thereof. The cap structure is adapted to removably engage the open top of a liquid container 14 and in the illustrated embodiment this is accomplished by the provision of threads about the indentation 13 adapted to engage threads about the open top of the container 14. A low upstanding wall 16 is formed about the upper periphery of the plate 12 and a central upstanding boss 17 is formed on the plate 12 with a height that is not greater than that of the wall 16 and is preferably of the same height. The boss 17 has a generally semi-circular configuration in plan view as seen in FIG. 2, for example, with the flat side thereof lying along a center line of the cap structure and has a lateral extension 18 extending to the wall 16. Obviously the boss may have other configurations. The entire cap structure described above is preferably formed as a single unit from a plastic or the like; however, the wall may be formed as a separate element and attached to the plate 12 as by mating threads.

Beneath the cap structure there is formed a manually or machine operable pump 21 comprised as a cylindrical open ended tube or barrel 22 fitted into and secured to a recess in the underside of the plate 12 and having a cylindrical plunger 23 slidably disposed therein and extending from the bottom of the barrel or tube 22 through the plate 12 to the top or upper surface thereof. The cylindrical plunger 23 has an enlarged end or head 24 which, in the illustrated embodiment, is formed of rectangular shape with a small rectangular projection 26 extending laterally therefrom slightly below the top surface of the plunger head 24. It will be seen that the plunger is adapted to be moved up and down in the tubular barrel 22 and the pump 21 is completed by valve means 31 connected to the bottom of the barrel 22.

A short hollow tube 32 extends downwardly from the otherwise closed bottom end of the barrel 22 and a check valve unit 33 is connected thereto by a short flexible hose 34 which slip fits over the tube 32 and the upper end of the check valve 33. A second short piece of hose 36 slips over the lower end of the check valve 33 and extends substantially to the bottom of the container 14. The check valve 33 is quite conventional and may, for example, be formed of glass or the like, with a ball or disc 37 therein limitedly movable to allow the passage of liquid upwardly through the check valve and closing the opening in the valve to prevent liquid from flowing downwardly through the valve. Also at the bottom of the pump barrel 22 there is provided a lateral tubular extension 41 inclined upwardly therefrom at an angle, as shown, and having an upturned end upon which there is placed a short piece of hose 42 that in turn slip fits the lower end of a second check valve 43. A dispenser tube 44 has an inner depending end extending through the cap structure plate 12 whereat a short piece of hose or tubing 46 is slip fitted over the end thereof and extends into slip fitting engagement with the upper end of the check valve 43. The dispenser tube 44 has a horizontal portion extending from the above-noted depending portion radially outward of the cap structure with a nozzle end pointing generally downwardly and outwardly of the cap structure for the discharge of liquid from the container. The check valve 43 operates in the same manner as the check valve 33 by inclusion of a ball or disc 47 capable of limited movement upwardly under liquid pressure to pass liquid upwardly through the check valve but normally resting in closing relation to the lower opening in the valve to prevent the passage of liquid downwardly through the valve.

The particular arrangement of check valves and flexible tubes or hoses is provided for the purpose of facilitating disassembly of the valving means should it become necessary to do so. This structure is not necessary but is advantageous in the foregoing respect. It is also noted that the inlet tube 32 of the pump and the upwardly inclined outlet tube 41 of the pump are both located at the bottom of the pump barrel 22. This is particularly advantageous in preventing the entrapment of air in the valve for it is necessary to completely purge the pump of air in order to accurately dispense desired quantities or volumes of liquid by pump operation. The cap structure 11 is provided with an opening 48 through the floor 12 thereof so that air pressure may operate upon the upper surface of liquid within the container 14. This opening 48 also enables the filling of the bottle without removing the cap.

Regarding pump operation it is noted that upward movement of the plunger 23 in the barrel 22 will cause air pressure acting on the upper surface of liquid in the bottle to force liquid through the check valve 33 into the barrel 22. Subsequent downward movement of the plunger will force this liquid through the check valve 43 and out the dispensing tube 44. In order to initially operate the pump a number of rapid actuations will serve to force any air in the pump system out of the dispensing tube 44 so that subsequently the entire pump system is filled with liquid and the amount of liquid dispensed by a single pump stroke up and down will be the volume of liquid drawn into the barrel by the upward stroke of the plunger. In normal operation the pump is operated only by full stroke of the plunger as limited by gauge means described below. Inasmuch as the plunger extends to the bottom of the barrel when fully depressed, and the tube 41 is inclined upwardly, there is not volume left within which air may reside and of course it will be appreciated that the plunger 23 tightly fits the barrel 22 so that neither air nor liquid may pass upwardly along the barrel about the plunger.

The liquid dispenser of the present invention is provided with means for accurately predetermining the exact amount of liquid to be dispensed by each full stroke of the pump plunger 23. To this end there are provided gauge means 51 including a hollow tube 52 inserted in an opening in the floor 12 of the cap structure and depending therefrom in parallel relation to the pump barrel 22. The tube 52 has a closed bottom end so as to seal the interior of the tube from liquid in the container 14. Within the tube 52 there is disposed a gauge rod 53. The tube 52 is located beneath the boss 17 of the cap structure and within the tube the gauge rod 53 extends from the bottom of the tube to the top of the boss 17. This gauge rod 53 may be of a generally cylindrical configuration with a longitudinal slot 54 therein on the side of the gauge rod facing the pump. The pump barrel 22 and gauge rube 52 are disposed in parallel side by side relationship and the lateral extension 26 on the pump plunger head 24 fits into the slot 54 in the gauge rod 53. The upper end of the slot 54 in the gauge rod 53 is disposed adjacent the upper end of the gauge rod and in fact the slot 54 is terminated by 2 lateral projection short of the upper end of the gauge rod. This termination may, for example, be provided by a washer 57 having the same cross sectional configuration and size as the gauge rod and disposed atop same with a screw 58 extending therethrough and threaded into the upper end of the gauge rod to hold the washer in station for closing the upper end of the slot 54. Alternatively, the gauge rod may be formed as a single unit of plastic or the like with the slot therein closed at the upper end by the rod material.

As noted above, the gauge rod is slidably disposed in the tube 52 and extends through an opening in the cap structure floor 12 and boss 17. In retracted position the gauge rod 53 has the top thereof substantially even with the top of the boss 17 of the cap structure, as particularly illustrated in FIG. 4. As also shown in this Figure, the bottom of the gauge rod rests upon the closed bottom end of the gauge tube 52 in the depressed position of the rod. The tubes 22 and 52, as well as the dispensing tube 44, are secured to the cap structure as by cementing same thereto or by a press fit.

With the plunger head projection 26 fitting within the gauge rod slot 54, it will be appreciated that upward movement of the plunger head will raise the gauge rod inasmuch as the extension 26 will contact the upper end of the slot, which may be formed by washer 57, to slide the rod upwardly. The gauge rod is provided with markings or graduations 59 thereon and appropriate legends, such as those illustrated at 61 of FIG. 3, to identify particular liquid volumes corresponding to the gauge markings. The markings 59 of the gauge indicate the height to which the plunger 23 is raised when the plunger engages the upper end of the slot so that the legends 61 of the gauge identify the volume beneath the plunger in its uppermost position. The gauge rod 53 is adapted to be raised to a desired volume of pump displacement per stroke and then locked in position so that each pump operation will dispense the predetermined volume of liquid as indicated by the gauge. This locking of the gauge rod may be accomplished by the provision of a pin 62 having an outer knurled end 63 and threaded into an opening in the extension 18 of the cap structure boss 17. The inner end of the pin 62 extends through a small lateral opening in the boss 17 into the vertical opening therethrough within which the gauge rod 53 is disposed. Consequently rotation of the pin by the knurled end 63 thereof will move the pin in or out of the cap structure to bring the inner end of the pin into engagement with the gauge rod 53 and lock same in adjusted vertical position or release the gauge rod for vertical movement.

In operation of the present invention the cap structure is attached to the open end of the liquid container 14 as, for example, by threaded engagement therewith as illustrated, for example, in FIG. 1. The pump plunger is then raised by the top 24 thereof to raise the gauge rod 53 to the desired volume of liquid to be dispensed, as indicated by the marking 59 at the top of the boss 17. The gauge rod is then locked in this raised position by the locking means 62 to limit the pump stroke to the indicated volume displacement. The pump plunger is then gripped by the head 24 and moved up and down through the full stroke thereof a number of times to purge the pump system of air. It is then only necessary for an operator to grip the enlarged head 24 of the plunger and move it upwardly as far as allowed by the gauge rod and then to depress it as far as it will go to eject from the dispensing tube 44 the exact amount of liquid indicated by the gauge rod. In order to facilitate finger gripping of the plunger head, cutout portions 66 are provided in the wall 16. There may also be provided a cutout portion 67 in the wall 16 for extension of the dispensing tube 44 through the wall. It will be appreciated that the distance X indicated by the markings on the gauge rod is the distance that the enlarged head of the plunger may be moved upwardly and consequently is equal to the distance Y that the bottom of the plunger moves upwardly. Thus the pump displacement for each stroke is in fact precisely adjustable and clearly indicated by the gauge means 51. In order to dispense a different volume of liquid per pump stroke, it is only necessary to readjust the position of the gauge rod 53.

One of the major advantages of the present invention is the physical configuration of same when the dispenser is not in use. In this respect particular reference is made to FIG. 4 wherein it will be seen that the pump plunger is depressed and the gauge rod 53 is also depressed into the cap structure so that the top of the cap is substantially planar. The heights of the boss 17 and of the enlarged head 24 of the pump plunger are substantially the same as or less than the height of the upstanding wall 16 about the cap structure floor 12. The dispenser tube 44 extends outwardly of the cap structure below the top of the upstanding wall 16. Additionally the locking means 62 is disposed below the top of the upstanding wall so that in effect the upper surface of the liquid dispenser of the present invention is substantially flat with only certain indentations therein. This has the advantage of protecting the dispenser from inadvertent damage by contact with other elements that might ben or break portions of the dispenser and furthermore provides the capability of stacking liquid containers having the liquid dispenser hereof attached to the top thereof. The low profile structure hereof is particularly advantageous in those applications wherein storage of containers with dispensing means thereon must be made in limited volume, as in a refrigerator, during shipping, or the like.

Although the present invention has been described with respect to a particular preferred embodiment thereof, it will be appreciated by those skilled in the art that variations and modifications may be made within the scope of the present invention. It is, consequently, not intended to limit the present invention to the precise terms of description or details of illustration.

What is claimed is:

1. A liquid dispensing device comprising
    a cap structure adapted to engage the open top of a liquid container and having a floor with a low upstanding wall thereabout and a slotted boss on said floor extending upwardly to a height not greater than that of said wall,
    a pump including a hollow barrel depending from said floor and a plunger slidably disposed in said barrel in extension through said floor with an enlarged upper end disposed atop the floor of said cap structure,
    an elongated gauge rod with markings along the length thereof depending from said cap structure and slidably disposed through the floor and boss thereof with a lateral projection atop said rod disposed to engage the enlarged upper end of said plunger, said gauge rod being movable upwardly from a depressed position with the lateral rod projection aligned with the top of said boss whereby the upper end of said pump plunger and said gauge rod are movable upwardly of said wall during use and are otherwise disposable below the top of said wall to provide a substantially flat top to the cap structure,
    locking means for adjustably positioning the top of said gauge rod a measured distance above said cap structure as indicated by said markings to establish the maximum movement of said pump plunger, and
    valve means connecting the bottom of said pump barrel to the interior of said container and to distance means extending through said cap structure whereby adjustable positioning of said gauge rod predetermines the volume of liquid dispensed by said container by each full stroke of said plunger.

2. The dispenser of claim 1 further defined by a tube having a closed lower end depending from said cap structure about said gauge rod for sealing said rod from the interior of said container.

3. The dispenser of claim 1 further defined by said locking means comprising a pin extending laterally through a portion of said boss in threaded engagement therewith for tightening against said gauge rod to lock same in adjusted vertical position.

4. The dispenser of claim 1 further defined by said gauge rod having a longitudinal slot in a side thereof facing said pump plunger with said lateral rod projection comprising a closed upper slot end adjacent the top of the rod, and said plunger having the enlarged upper end thereof extending laterally of said plunger into longitudinally slidable engagement with said slot in said gauge rod whereby said plunger is only movable longitudinally of said rod to the limit of plunger end engagement with the upper slot end.

5. A liquid dispenser device comprising
- a cap structure having a depending internally threaded rim for engaging the open top of a liquid container and a low upstanding wall thereabout with a central upstanding boss having a height that is no greater than the height of said wall,
- first and second parallel hollow tubes depending from said cap structure with said second tube disposed beneath said boss,
- a cylindrical plunger slidably disposed in said first tube and extending through said cap structure with an enlarged head resting atop said cap structure when the plunger extends to the bottom of said first tube,
- a gauge rod having markings thereon extending from the top of said boss to the closed bottom end of said second tube in slidable relation thereto,
- said gauge rod having a longitudinal slot therein with a closed upper slot end adjacent the top of the rod and the enlarged plunger head slidably disposed in said slot for limiting said plunger to movement longitudinally of said gauge rod,
- locking means extending through said boss for engaging said gauge rod to fix same an adjustable distance in extension above said boss and wall as indicated by said markings and thereby limiting longitudinal movement of said pump plunger to the fixed adjusted height of said gauge rod above said cap structure, and
- valve means connected to the bottom of said first tube for connecting said first tube to the interior of a container engaged by said cap structure and to dispensing means extending through said cap structure below the top of said wall
- whereby movement of said plunger through a full stroke up and down as limited by said gauge rod dispenses a predetermined volume of liquid as set by said gauge rod indicated by the markings thereon and the device having a flat upper profile with gauge rod and plunger depressed into said tubes.

6. The dispensing device of claim 5 further defined by the enlarged head of said plunger having a rectangular configuration with a depth substantially equal to or less than the height of said upstanding wall with a lateral extension thereof below the top of the head extending into the slot in said gauge rod and said upstanding wall having cutout portions adjacent said plunger head for access thereto to operate the plunger.

* * * * *